Jan. 2, 1923.

V. G. APPLE.
DYNAMO ELECTRIC MACHINE.
FILED JUNE 11, 1920.

Inventor
Vincent G. Apple
By Toneé Bain & Hinkee
Attys.

Jan. 2, 1923. 1,440,952

V. G. APPLE.
DYNAMO ELECTRIC MACHINE.
FILED JUNE 11, 1920. 2 SHEETS-SHEET 2

Inventor:
Vincent G. Apple
by Jonce Rain & Hinkle
Attys

Patented Jan. 2, 1923.

1,440,952

UNITED STATES PATENT OFFICE.

VINCENT G. APPLE, OF DAYTON, OHIO.

DYNAMO-ELECTRIC MACHINE.

Application filed June 11, 1920. Serial No. 388,217.

*To all whom it may concern:*

Be it known that I, VINCENT G. APPLE, a citizen of the United States, residing at Dayton, in the county of Montgomery and State of Ohio, have invented certain new and useful Improvements in Dynamo-Electric Machines, of which the following is a specification.

This invention relates to improvements in dynamo electric machines and the method of buiding them.

One of the objects of the invention is to improve dynamo electric machines, especially relatively small motors and generators, by reducing the cost of production; improving the manner of insulation to render the conducting bars or windings more stable; using the insulating mass to hold the field coils in place and encasing the conducting parts therein; attaching the metal base, carrying the bearings to the insulating body and improving the method of application of insulation and improving the bearing supports.

Another object is to produce a new article of manufacture in which the coil windings are impregnated with substantially pure phenolic condensation product while in a liquid state, and enclosed in a substantial coating of said material, all of which is applied during a single treatment and while in a mold and under pressure.

Another object is to inject insulating material, such as a phenolic condensation product, while in a liquid state, into a mold containing a dynamo electric machine or an element thereof, by application of pressure, while the insulating material is in a liquid state, thereby impregnating every part thereof during one operation and to maintain the pressure while the article is being heated to cause the desired reaction.

Heretofore it has been customary to dip a dynamo electric armature in a phenolic condensation compound while in liquid form and subsequently permit the liquid to dry. This is a very wasteful means of insulating the armature because a great deal of the liquid before it becomes sufficiently set to adhere to the armature will drip out and be wasted and besides all of the openings or voids are not filled. By placing the armature in a mold and injecting the liquid material into the armature under pressure, every portion of the material is usefully utilized and all openings completely filled.

The claims relating to the method of insulating dynamo electric machines are contained in my copending Ser. No. 367,363; filed Mar. 20, 1920.

Other, further and more specific objects of the invention will become readily apparent to persons skilled in the art, from a consideration of the following description, when taken in conjunction with the drawings, wherein:—

In all the views the same reference characters are employed to indicate similar parts.

Figure 4:
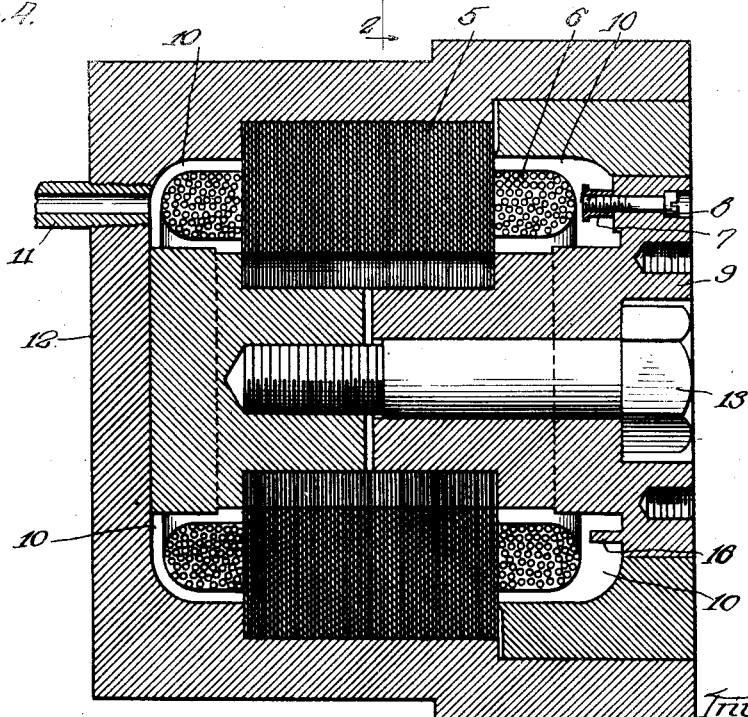
Fig. 4 is a sectional view of parts of a machine while in a hollow die, or mold, before application of the liquid insulation.

The field magnet frame 5 consists of a series of rings of suitable magnetically susceptible permeable material, such as soft steel, or iron. These rings are first coated with a phenolic condensation product, in the form of a varnish and allowed to become partially dried, or wholly dried. After the coated rings 5 have been assembled, pressure is applied to them and the adhesive, which has been applied to them, will cause them to stick together sufficiently for the application of the windings 6. With the rings 5, temporarily held together, and with the windings 6 applied thereto, the structure thus assembled is placed in a hollow die, or mold, as more clearly shown in Fig. 4. Metal inserts, such as 7, may be held temporarily in place by means of screws 8 inserted in the mold portion 9. The inserts are to be partly surrounded with insulating material which is to fill the spaces 10 left between the inner surfaces of the mold, or hollow die, and the physical part of the structure.

A pipe 11 is inserted into the mold and after the parts 9 and 12 thereof are put together and held by the bolt 13, or otherwise, the insulating phenolic condensation product, in liquid form, is forced into the mold, or hollow die, thru the pipe 11, by considerable pressure. This will fill all of the voids or spaces and will also permeate the windings 6 and will substantially embed the windings in the insulating material. The material will pass into space 10 thru the spaces left by the mold between the pole pieces on each side of the armature. It only requires a very few seconds to inject into the mold the necessary insulating liquid, after which the mold, with its contents is placed in a furnace or otherwise heated, while the liquid is under pressure, the mold and contents is maintained heated to the proper temperature for a sufficient time to cause the reaction of the insulating material. This will cause it to harden, as is well known, and a coating 13, composed of pure phenolic condensation product will entirely surround and protect the windings and afford means for connecting the metal armature supporting parts to the structure.

An annular rabbet 14 is formed in each end of the insulating ring of the structure, to receive a cup-shaped part 15. Three ribs 16 are made on the mold portion 9 to leave an opening in the insulation 13 within which to insert a threaded metallic nut 17 for a screw stud 18. There are, preferably, three such studs placed uniformly within the insulation of the structure to hold, by a bayonet joint, the cup-shaped part 15 in place. A tongue 19 is secured to, or is a part of, the cup-shaped structure 15 and has a bent portion 20 to engage the stud or pin 18. There are as many such tongues as there are studs 18. The notch 21, in the cup-shaped part, shows one manner of fastening the cup-shaped part in place, and the tongues 19 are the means for holding the parts together. The cup 15 has an annular inwardly extending cup portion 22 opening inwardly from the face thereof, provided with a bore 23 thru which a shaft of the armature may pass. A disk 24, within the part 22, is also provided with an axial opening 25 to permit the shaft to pass and between these two openings and within the space 26, a ball bearing structure is to be enclosed to furnish bearing support for the armature shaft to be placed within the field magnet structure herein shown.

Figure 1:
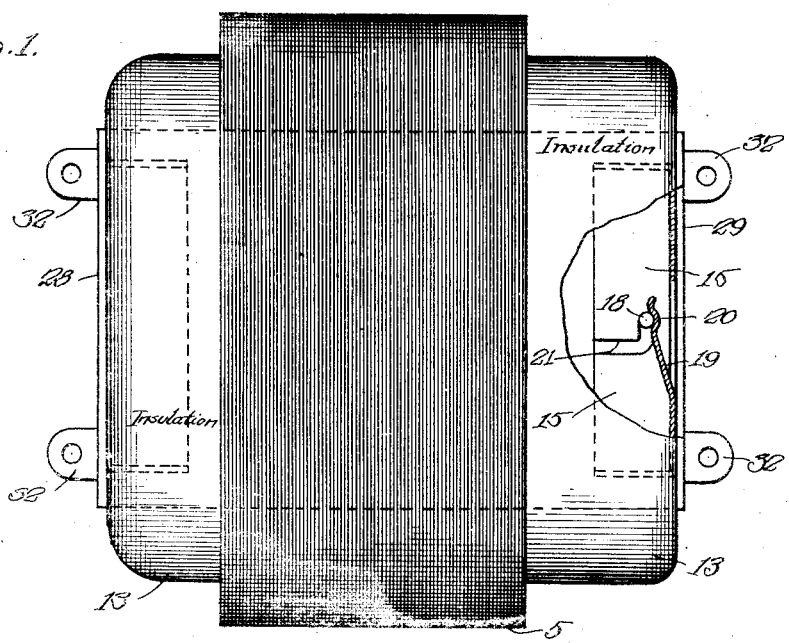
Fig. 1 is a plan view of the stator or field magnet of a dynamo electric machine, showing parts broken away.
Figure 2:
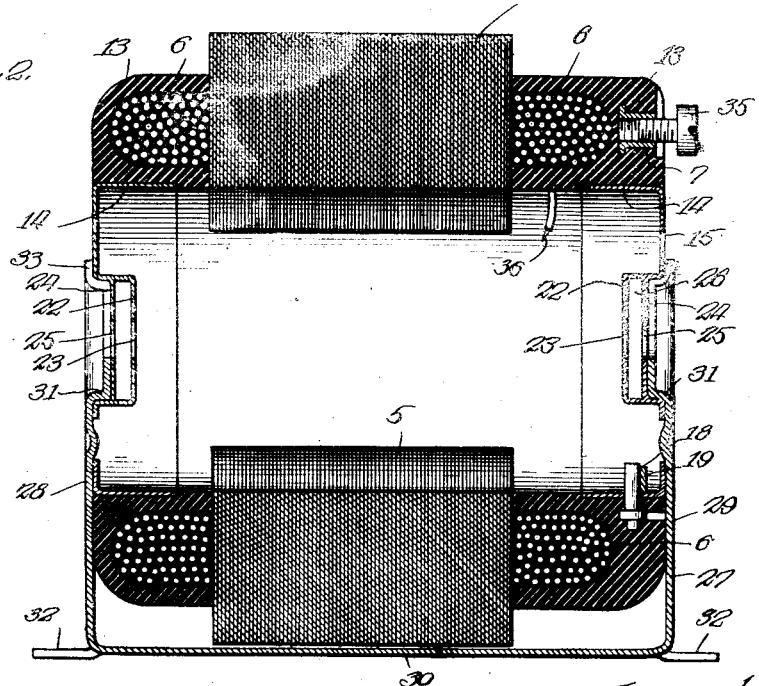
Fig. 2 is a central longitudinal section taken on line 2—2 of Fig. 3.
Figure 3:
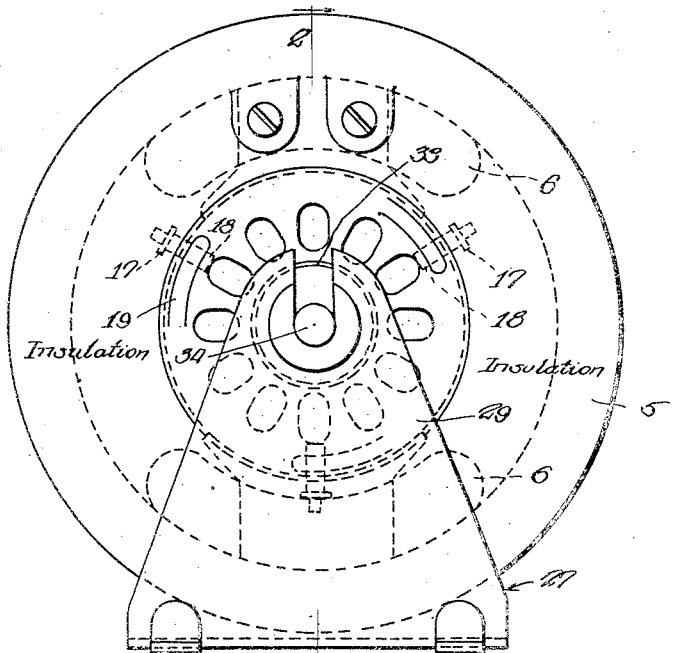
Fig. 3 is an end view of a complete machine.

A sheet metal base portion 27, comprising standards 28 and 29 and a base plate 30, has on each standard a part 31 to slip into the opening within the part 22 of the cup-shaped member 15. This supporting structure also is provided with feet 32 by which the machine may be secured to a base. Each of the parts 31 is slotted, as at 33, to enable this sheet metal device to be slipped over the shaft of the armature for the purpose of its application. After the ball bearings have been placed in the respective openings 26 and the shaft has been put into the field magnet, the member 27 is then put in place. The upstanding standards 28 and 29 are more or less yielding and will, for this purpose, permit the parts 31 to snap into the openings in the members 22. In Figs. 3 the shaft 34 of the armature is shown in place.

After the machine has been made in the manner heretofore described, the terminal screws 35 may be placed in the inserts 7 and the wires 36 may connect the inserts to the coils 6. If the machine is to be shunt-wound, then the wires 36, of which there may be two, are connected to their respective brush holders that are to be held in place on the outside surface of the member 22.

From the foregoing description, it will be noticed, that the dynamo described contains as few parts as possible in such a construction, and that it requires no screws or bolts to assemble them. The parts being made by punch and die, therefore, are of uniform dimensions and configuration.

While I have herein shown a single embodiment of my invention for the purpose of clear disclosure, it will be manifest to persons skilled in the art, that considerable changes may be made in the general arrangement and configuration of the parts within the scope of the appended claims.

Having described my invention what I claim as new and desire to secure by Letters Patent is:—

1. A dynamo electric machine having its windings covered with a relatively refractory coating of insulating moldable material; a metal structure for supporting the armature bearings, supported by said material and a base portion held in place by said metal structure.

2. A dynamo electric machine having its windings covered with a relatively refractory coating of insulating moldable material; a cup-shaped metal structure, at each end of the machine for containing armature bearings, supported by said material and providing a support for a brush holder, and a base portion held in place by said metal structure.

3. A field magnet element having a series of metal rings comprising the magnetic portion thereof; field magnet coil windings within the ring thus formed; a moldable insulating material covering the windings and providing a ring of insulating material at each end of the structure; an insertable metal cup within each insulating ring, within which to contain the armature bearings and fastening means extending into the insulating ring to hold the metal cup-shaped part in place.

4. A field magnet element having a series of metal rings comprising the magnetic portion thereof; field magnet coil windings within the ring; a moldable insulating material covering the windings and providing a ring of insulating material at each end of the structure; an insertable metal cup within each insulating ring within which to contain armature bearings; fastening means extending into the insulating ring to hold the metal cup-shaped member in place; a sheet metal base underlying the structure and having upturned standards engaging the respective insertable cup-shaped members to hold the base in place.

5. A field magnet element having a ring of insulating material at each end thereof with an opening thru which an armature may be inserted; a cup-shaped support insertable within the respective rings, said support having another integral cup-shaped support therein opening in the opposite direction, the latter cup to contain armature bearings and to provide an outer surface upon which to mount a rotatable brush holder.

6. A field magnet element having a ring of insulating material at each end thereof with an opening thru which an armature may be inserted; a removable cup-shaped support insertable within the respective rings, said support having another integral axially perforated cup-shaped support therein, opening in the opposite direction, the latter cup to contain armature bearings and to provide an outer surface upon which to mount a rotatable brush holder and a latch to hold the cup-shaped member in place.

7. In a dynamo electric machine a field frame having its windings covered with a coating of insulating material; a metal structure at each end of the frame for supporting armature bearings and held in place by said insulating material.

8. In a dynamo electric machine, a field frame having its windings covered with insulating material; and an armature support at each end of the frame held in place by said insulating material.

In testimony whereof I hereunto subscribed my name.

VINCENT G. APPLE.